(12) United States Patent
Zavada et al.

(10) Patent No.: US 9,822,271 B2
(45) Date of Patent: Nov. 21, 2017

(54) CERAMIC INKJET INK FOR RED DECORATION

(71) Applicant: Electronics for Imaging, Inc., Fremont, CA (US)

(72) Inventors: Mark Zavada, Wixom, MI (US); David Weber, Ann Arbor, MI (US); Louis Fage, Livonia, MI (US); Matthew Tennis, Howell, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 487 days.

(21) Appl. No.: 14/333,464

(22) Filed: Jul. 16, 2014

(65) Prior Publication Data

US 2016/0017161 A1     Jan. 21, 2016

(51) Int. Cl.
*C09D 11/30* (2014.01)
*C09D 11/38* (2014.01)
*C09D 11/322* (2014.01)

(52) U.S. Cl.
CPC ............ *C09D 11/38* (2013.01); *C09D 11/322* (2013.01)

(58) Field of Classification Search
CPC .............................. C09D 11/30; C09D 11/322
See application file for complete search history.

(56) References Cited

U.S. PATENT DOCUMENTS

| | | | |
|---|---|---|---|
| 7,896,483 B2 | 3/2011 | Etheridge | |
| 8,609,561 B2 | 12/2013 | Schneider et al. | |
| 2005/0006339 A1 | 1/2005 | Mardilovich et al. | |
| 2005/0182172 A1 | 8/2005 | Kamimura et al. | |
| 2005/0287090 A1 | 12/2005 | Bujard | |
| 2008/0053333 A1* | 3/2008 | Johnson | C03C 8/16 106/31.05 |
| 2008/0210122 A1* | 9/2008 | Magdassi | B41J 3/28 106/31.05 |
| 2012/0196126 A1 | 8/2012 | Axtell, III et al. | |
| 2013/0265376 A1 | 10/2013 | Gil-Torrente et al. | |
| 2014/0044894 A1* | 2/2014 | Shipway | E04C 2/546 428/29 |
| 2014/0146530 A1 | 5/2014 | Guiset et al. | |

FOREIGN PATENT DOCUMENTS

JP     2000169191 A     6/2000

OTHER PUBLICATIONS

Turner, T. et al., "Chemically Reduced Copper Reds in Oxidation", CeramicsTECHNICAL, No. 35, Nov. 2012; ISSN 1324-1475; <http://search.informit.com.au/documentSummary;dn=918222432372187; res=IELHSS>.

* cited by examiner

*Primary Examiner* — Veronica F Faison
(74) *Attorney, Agent, or Firm* — Perkins Coie LLP

(57) ABSTRACT

Disclosed are compositions, such as inkjet inks, for jetting onto a ceramic substrate, and associated methods and systems. The compositions comprise a pigment compound that is configured to be jetted on a ceramic substrate during a ceramic inkjet process to impart a color effect to the ceramic substrate, and a reduction agent which, when exposed to a firing temperature, reacts with the pigment compound to cause a reduction reaction. In some embodiments, the pigment compound comprises jettable copper particles, which can cause the fired composition to take on a red or oxblood color, which can be used for decoration.

30 Claims, 11 Drawing Sheets

CERAMIC INKJET INK FOR RED DECORATION

FIELD OF THE INVENTION

At least one embodiment of the present invention pertains to compositions that produce a reduction reaction, which impart a color effect to a ceramic substrate when exposed to a firing temperature.

BACKGROUND

In ceramic inkjet printing processes, traditional inorganic ceramic glazes and/or stains can produce stable red shades at higher temperatures, from zircon-encapsulated cadmium selenide (CdSe) pigments, which are commonly referred to as cadmium red.

However, inkjet ink pigments require smaller particle sizes than traditional ceramic stains and therefore usually include a pigment milling step in the manufacturing process. This milling step compromises the protective encapsulation layer used with CdSe pigments, and leaves the pigment vulnerable to degradation and color loss. CdSe pigments are not useable in ceramic inkjet inks at this time.

In the field of inkjet ceramics, options for red shade colors at porcelain firing conditions are not known to exist at this time.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here is a technique that enhances or extends an available color gamut for inkjet ceramics to provide, for example, red shade color options at porcelain firing conditions.

In certain embodiments, the technique introduced here involves the following sequence of actions, as described more fully below. Initially, an enhanced composition is jetted onto a ceramic substrate (also called a "workpiece"), e.g., a ceramic tile. The composition comprises a pigment compound, and a corresponding reduction agent, which are configured to be jetted, either together or separately, onto a ceramic workpiece. In some embodiments, the pigment compound comprises particles of a copper component, wherein the pigments are sized, e.g., by milling, to be jetted through an inkjet system. The reduction agent is configured to react with the pigment compound during the firing of the ceramic workpiece.

In some embodiments, the enhanced composition can expand the available color gamut, as compared to prior jettable compositions, such as to produce a red component, e.g., oxblood red, either alone or combined with other color components.

Figure 1:
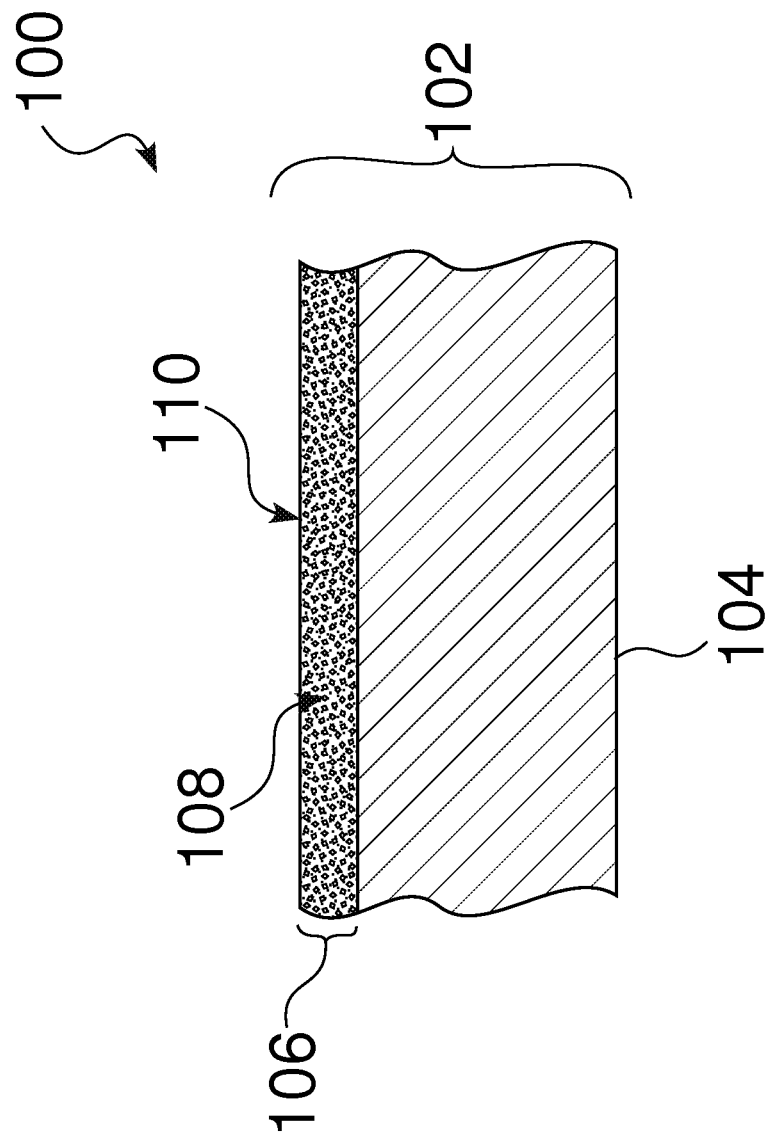
FIG. 1 illustrates an embodiment of an enhanced composition that is jetted onto a ceramic substrate, wherein the enhanced composition comprises a pigment compound and a reduction agent.
Figure 5:
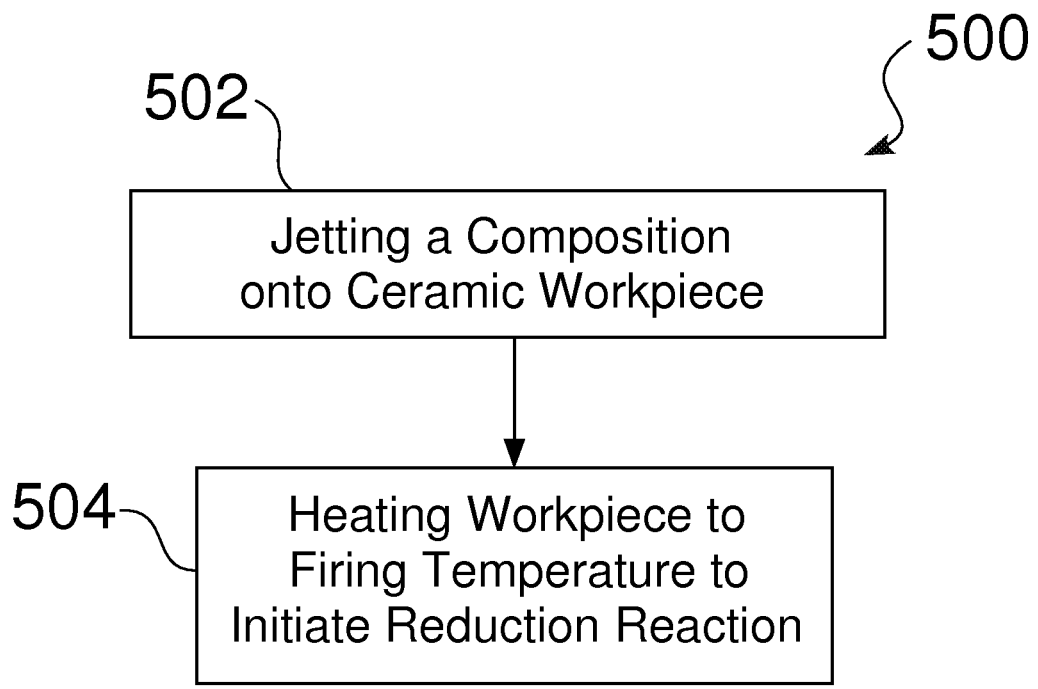
FIG. 5 is a flowchart of a method for producing an enhanced ceramic workpiece.
Figure 6:
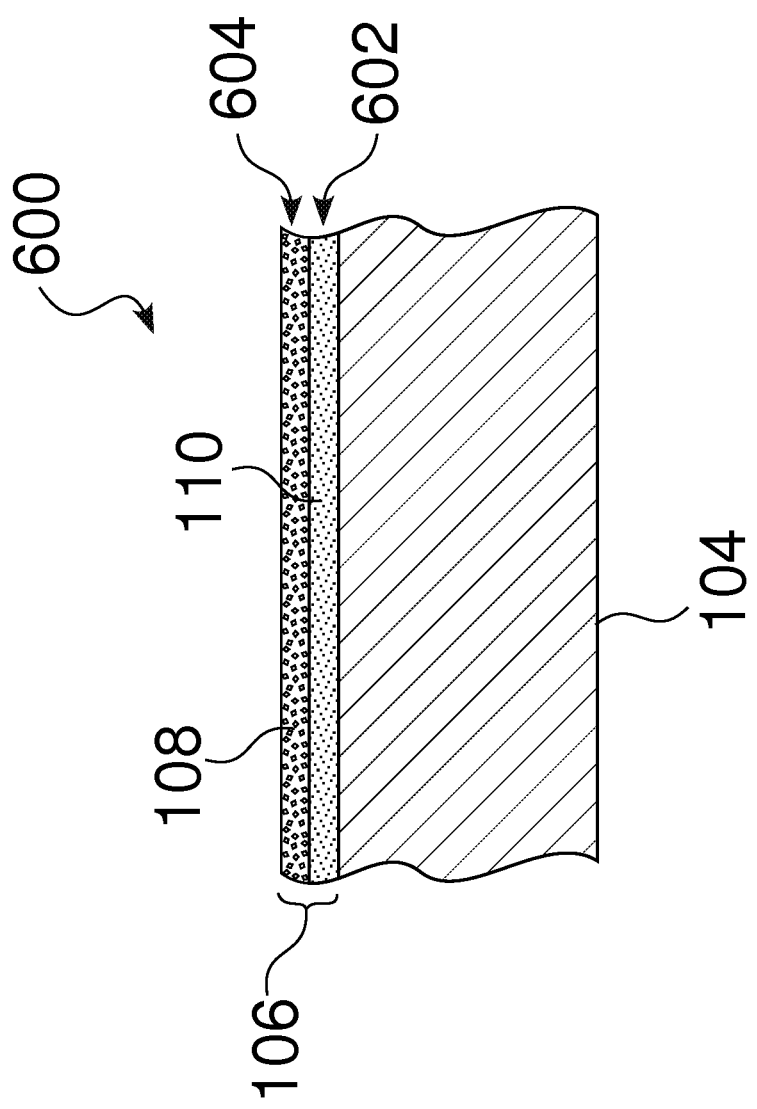
FIG. 6 illustrates an embodiment of an enhanced composition on a ceramic substrate, comprising a reduction agent jetted onto the ceramic substrate, and a pigment compound jetted onto the reduction agent.
Figure 7:
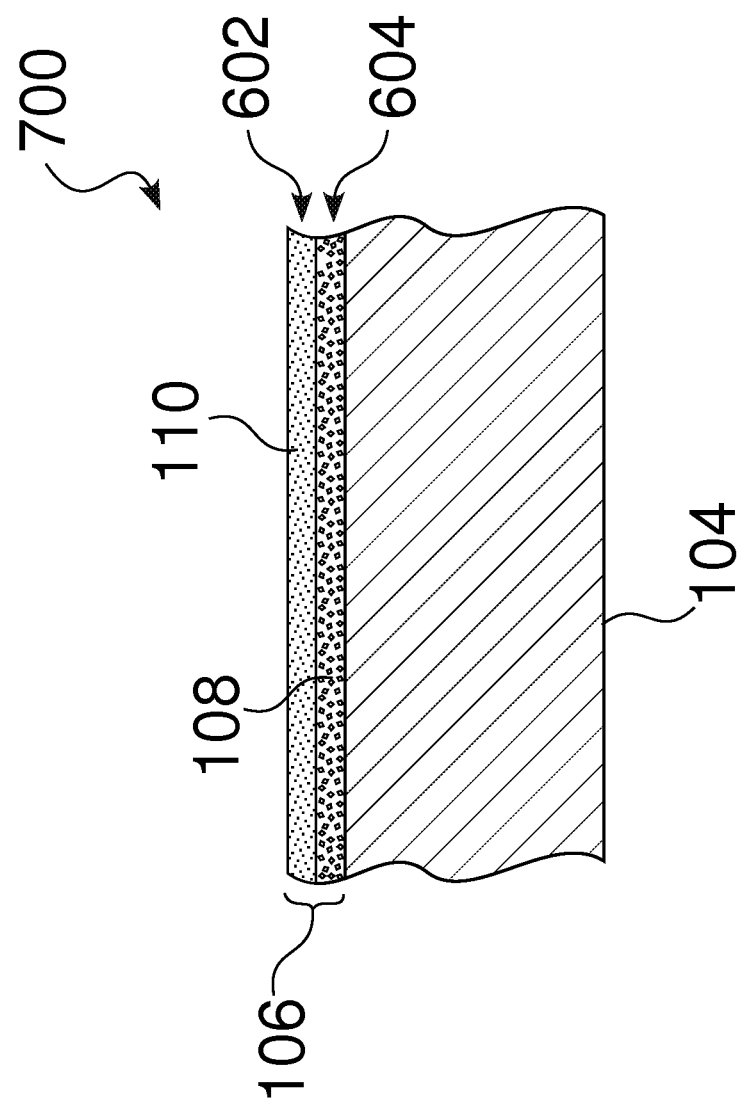
FIG. 7 shows an embodiment of an enhanced composition on a ceramic substrate, comprising a pigment compound jetted onto the ceramic substrate, and a reduction agent jetted onto the pigment compound.

FIG. 1 illustrates an embodiment 100 of an enhanced composition 106, e.g., an inkjet ink, on a ceramic substrate 104, wherein the enhanced composition 106 comprises a pigment compound 108 and a reduction agent 110. The composition 106 can be jetted 314 (FIG. 3), 502 (FIG. 5) onto the ceramic substrate 104, such as by one or more print heads 306. The composition 106 shown in FIG. 1 can comprise one or more jetted layers 106,602,604 (FIG. 6, FIG. 7). The ceramic workpiece 102 is subsequently fired (e.g., in a kiln), causing a reduction reaction 204 between the pigment compound 108 and the reduction agent 110.

While the workpiece 104 is generally described herein as a ceramic substrate 104, it should be understood that the technique introduced here can be suitably adapted for a wide variety of workpieces that can be fired, e.g., tiles, such as ceramics, which can be manufactured from clay, minerals and water, or porcelain, which can be manufactured from finely ground sand.

Figure 9:
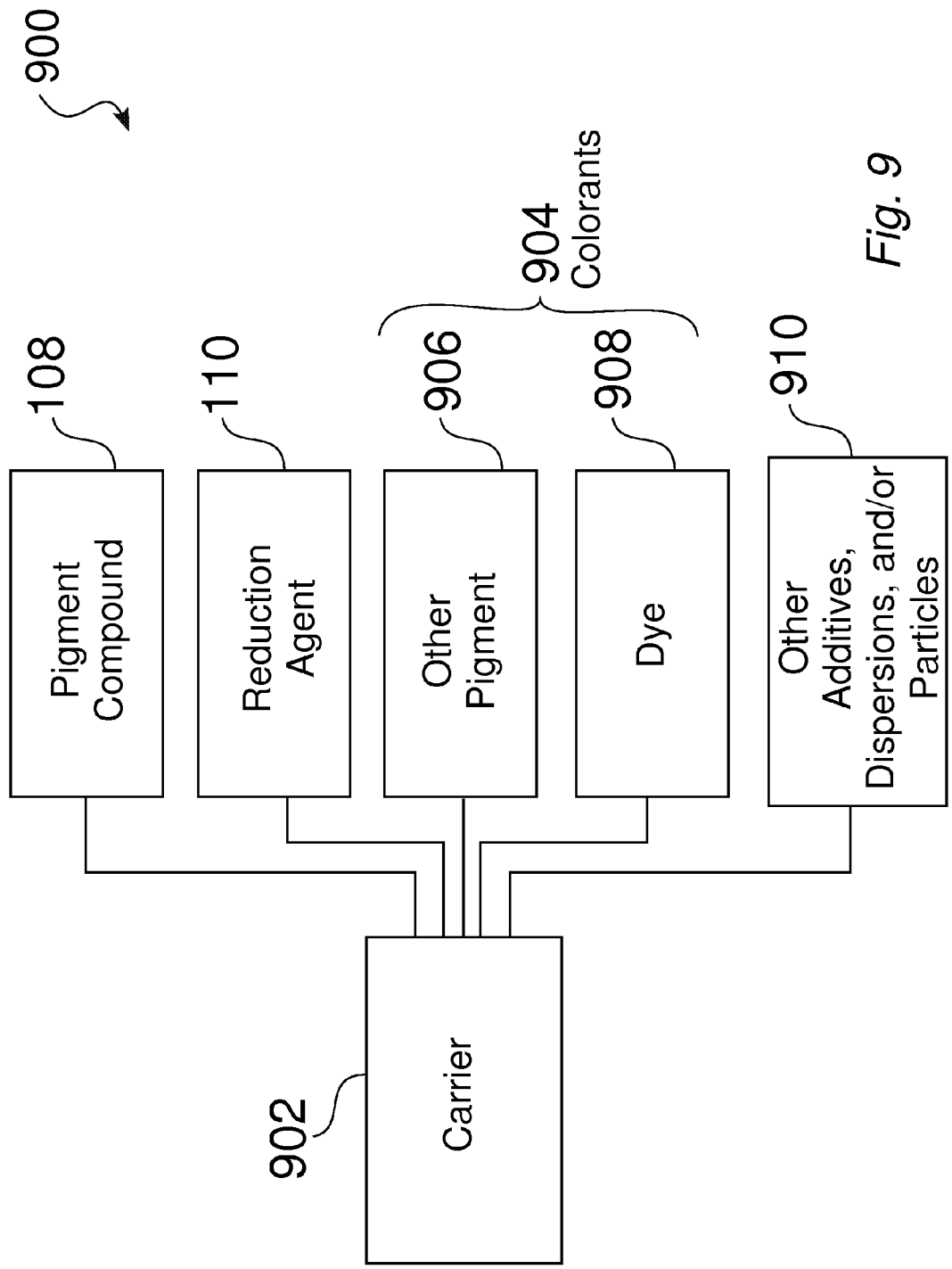
FIG. 9 is a schematic block diagram of components that can be included in some embodiments of the enhanced composition.

In some embodiments, the pigment component 108 includes particles of a copper component, such as comprising any of $CuO$, $CuCO_3$, or $CuSO_4$. The size of the particles is configured to be jetted 314 (FIG. 3), such as within a carrier 902 (FIG. 9). For example, in an embodiment, the pigment particles are milled to an average particle size of 1 micron or less. In some embodiments, the copper particles cause the enhanced composition 106 to take on a red color, e.g., having a characteristic wavelength of 620-740 nm, upon firing 504 (FIG. 5). In some embodiments, the copper particles cause the enhanced composition 106 to take on a violet, burgundy, or oxblood color, e.g., having a characteristic wavelength of 380-440 nm, upon firing 504.

In an embodiment of the composition 106, the reduction agent 110 is configured to produce a reduction reaction with the pigment component 108, when fired on the ceramic substrate 104. For instance, for a pigment component 108 comprising a copper component, as discussed above, the reduction agent 110 may preferably comprise any of SiO, SiC, SiN, or BN.

In one example, an oxblood red color results from the reduction of $Cu^{2+}$ to $Cu^+/Cu^0$. Since $SiO_2$ is a primary component in glaze formulations, the $SiO_2$ produced during the reduction of the copper pigment component 108 is incorporated into the resultant glaze 206 (FIG. 2), upon the application of sufficient heat. An example is shown in Equation (1)

$$4CuO(Black) + Si \rightarrow 2Cu_2O_{(Red)} + SiO_2. \qquad (1)$$

Figure 2:
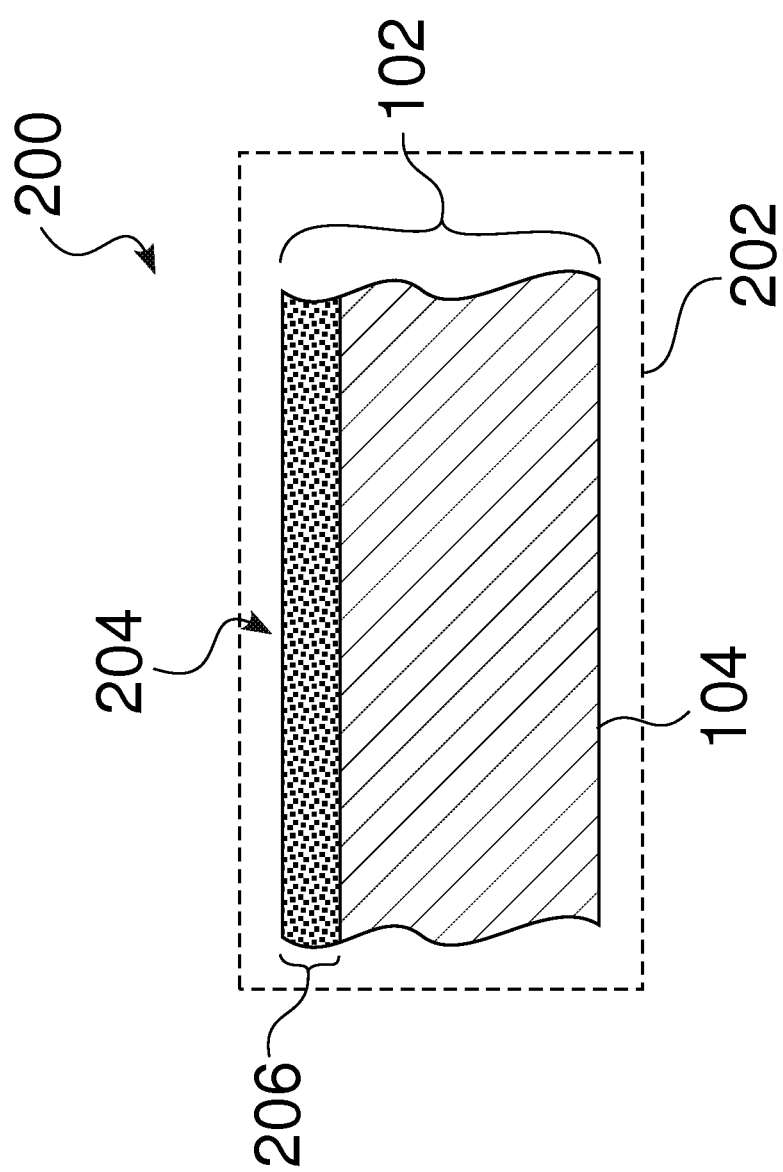
FIG. 2 is a schematic block diagram of an enhanced composition on a ceramic substrate, wherein the workpiece is exposed to a firing temperature, and wherein the reduction agent reacts with the pigment compound to cause a reduction reaction.

FIG. 2 is a schematic block diagram 200 of an enhanced composition 104 (FIG. 1) on a ceramic substrate 102, wherein the workpiece 102 is exposed to a firing temperature 202, and wherein the reduction agent 110 reacts with the pigment compound 108 to cause a reduction reaction 204. The substrate 104 may comprise a variety of ceramics 104 that can be fired in any temperature range that corresponds to the reduction reaction 204. In some embodiments of the enhanced composition 106 wherein the pigment component 108 includes copper, the firing temperature 202, when controlled within a kiln 404 (FIG. 4) has a range of 1050 degrees C. to 1300 degrees C. The jetted composition 106 on the workpiece 102 forms a glaze 206 as a result of the firing 504 (FIG. 5), whereby the color of the resultant glaze 206 takes on a color due to the reduction reaction 204 between the pigment compound 108 and the reduction agent 110. The specific resultant color can also depend on specific operational parameters, e.g., specific temperatures, firing schedules, temperature ramping, down-firing, etc., and/or the use of one or more additional constituents in the composition 106, such as other pigments 906 (FIG. 9), dyes 908 (FIG. 9), and/or other additives, dispersions, or particles 910 (FIG. 9).

Figure 3:
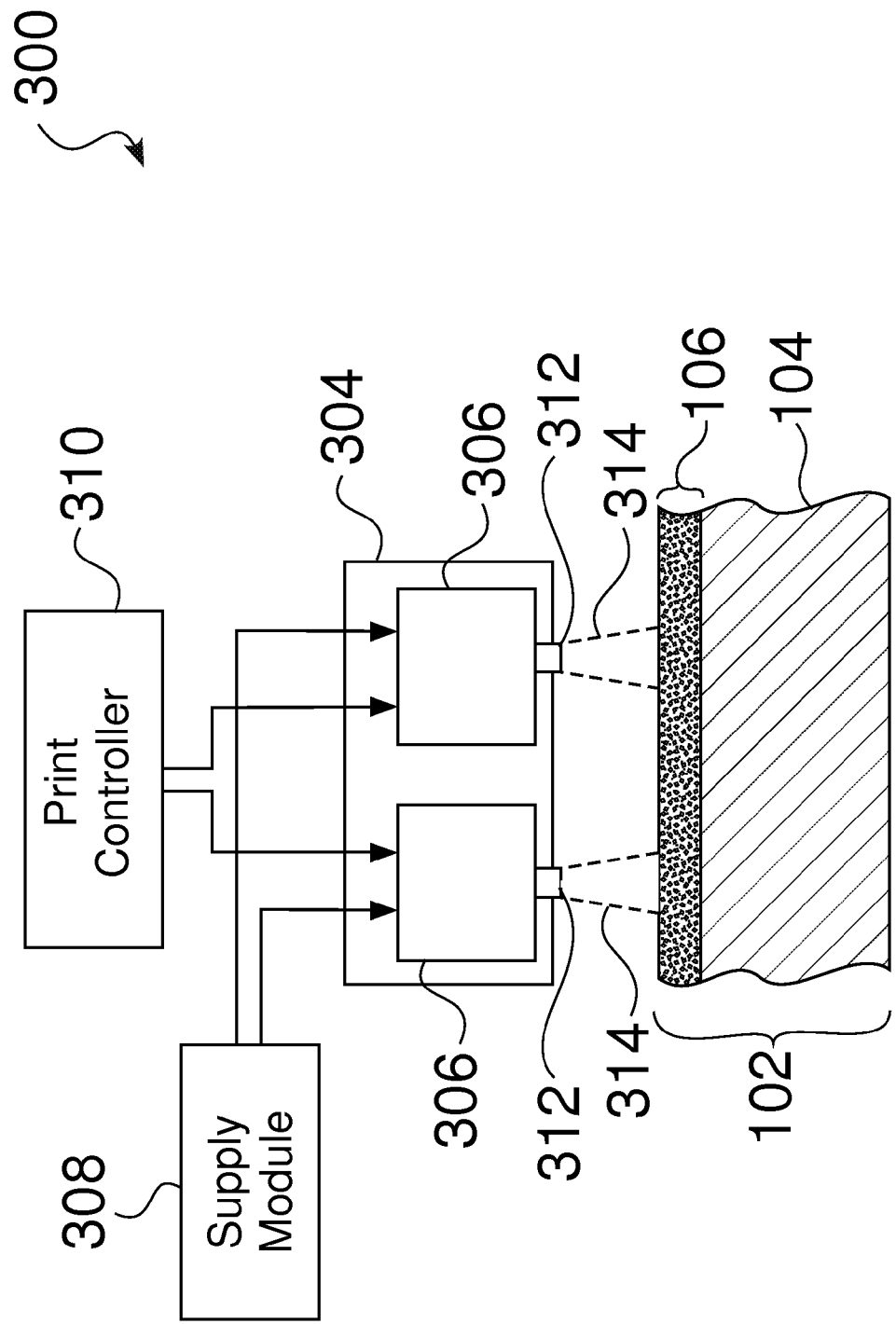
FIG. 3 is a schematic diagram of a printing environment for jetting a composition onto a ceramic workpiece, wherein the composition comprises a pigment compound and a reduction agent.

FIG. 3 is a schematic diagram 300 of an illustrative printing system 302 for jetting 314 a composition 106 onto a ceramic workpiece 104, wherein the composition 106 comprises a pigment compound 108 and a reduction agent 110. The printing system 302 seen in FIG. 3 includes a print head assembly 304, comprising one or more print heads 306 having corresponding jets 312. A supply module 308 is connected to the print heads 306, whereby the composition is transferred to the print heads 306, for jetting 314 onto a ceramic substrate 104, as controlled by a print controller 310.

Figure 4:
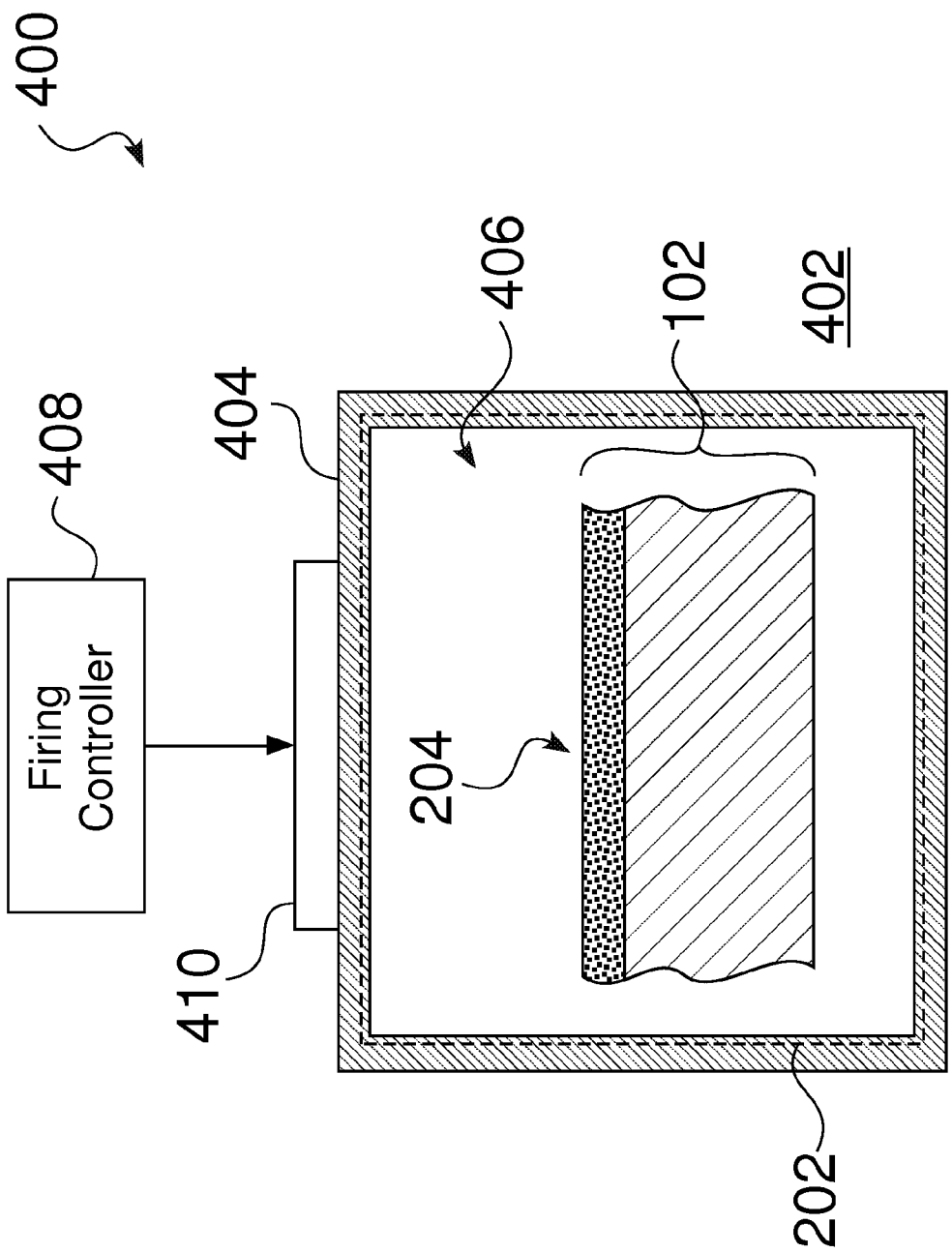
FIG. 4 is a schematic diagram of a system for heating a ceramic workpiece having a jetted composition, wherein when exposed to the heat, the reduction agent and the pigment compound react to cause a reduction reaction.

FIG. 4 is a schematic diagram 400 of a firing system 402 for heating a ceramic workpiece 102 having a jetted composition 104 (FIG. 3), wherein when exposed to sufficient heat, the reduction agent 110 and the pigment compound 108 react to cause a reduction reaction 204. The firing system 402 seen in FIG. 4 includes a kiln 404 having an interior 406 defined therein, and a heating system 410, under the control of, e.g., a firing controller 408, wherein the heating system 410 comprises a heat source and can additionally comprise a mechanism for air circulation, e.g., a fan. The firing system 402 is operable to heat the jetted substrate 102 to a firing temperature 202 in a temperature range from 1050 degrees C. to 1300 degrees C., to cause a reduction reaction 204 between the pigment compound 108 and the reduction agent 110. The jetted composition 106 on the workpiece 102 forms a glaze 206 as a result of the firing, while the color of the resultant glaze 206 takes on a color due to the reduction reaction 204 between the pigment compound 108 and the reduction agent 110.

FIG. 5 is a flowchart of a method 500 for producing an enhanced ceramic, which comprises jetting 502 a composition 106 onto a ceramic substrate, i.e., a workpiece 104, wherein the composition 106 comprises a pigment compound 108 and a reduction agent 110, and heating 504 the composition to a temperature at which a reduction reaction 204 occurs between the reduction agent 110 and the pigment compound 108, causing a color effect to be produced on the ceramic substrate 104.

In some embodiments of the technique introduced here, the pigment compound 108 and the reduction agent 110 can be supplied in a single composition 106, such as within an appropriate jettable carrier 902 (FIG. 9), e.g., water, whereby the pigment compound 108 and the reduction agent 110 are jetted 502 concurrently onto the ceramic substrate 104. However, other embodiments of the technique allow separate jetting of the pigment compound 108 and the reduction agent 110, as long as the pigment compound 108 and the reduction agent 110 come into contact with each other during the heating 504, to initiate the reduction reaction 204 between the reduction agent 110 and the pigment compound 108.

For example, FIG. 6 illustrates an embodiment 600 of an enhanced composition 106 on a ceramic substrate 104, wherein the enhanced composition 106 comprises a layer 602 of reduction agent 110 that is jetted 502 onto the ceramic substrate 104, and a layer 604 of pigment compound 108 that is jetted 502 onto the layer 602 of reduction agent 110.

As another example, FIG. 7 shows an embodiment 700 of an enhanced composition 106 on a ceramic substrate 104, wherein the enhanced composition 106 comprises a layer 604 of pigment compound 108 that is jetted 502 onto the ceramic substrate 104, and a layer 602 of reduction agent 110 that is jetted 502 onto the jetted layer 604 of pigment compound 108.

Figure 8:
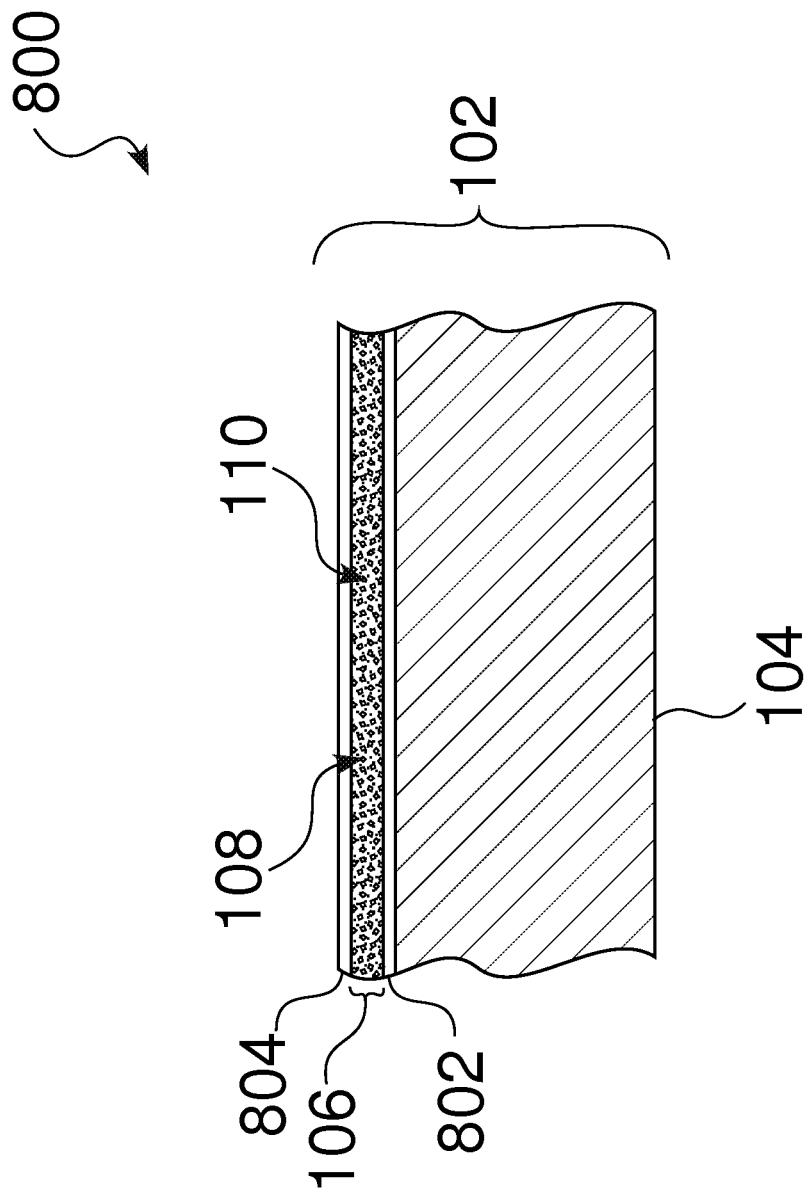
FIG. 8 illustrates an alternate embodiment of an enhanced composition on a ceramic substrate, which can include one or more jetted layers below and/or above the composition.

FIG. 8 illustrates an alternative embodiment 800 of an enhanced composition 106 on a ceramic substrate 104, which can include one or more jetted layers below 802 and/or above 804 the composition 106. For example, a jetted lower layer 802 can comprise any of a primer, a basecoat, and/or one or more jetted colors. Similarly, a jetted upper layer 804 may comprise one or more jetted clear, translucent or opaque color layers over at least a portion of the jetted composition 106.

FIG. 9 is a schematic block diagram 900 of components that can be included in some embodiments of the enhanced composition 106. As discussed above, the pigment compound 108 and the reduction agent 110 can be supplied as a single composition 106 with, e.g., an appropriate carrier 902. The combined composition 106 can further comprise, for example, any of additional colorants 904, e.g., other pigments 906 and/or dyes 908, or other constituents 910, such as additives, dispersions, and/or jettable particles.

As also discussed above, some embodiments of the technique allow for separate jetting of the pigment compound 108 and the reduction agent 110, whereby each of the pigment compound 108 and the reduction agent 110 are supplied as jettable compositions, e.g., each within a corresponding carrier 902. One or both of the pigment compound 108 and the reduction agent 110 can further comprise any of additional colorants 904, e.g., other pigments 906 and/or dyes 908, or other constituents 910, such as additives, dispersions, and/or jettable particles.

Figure 10:
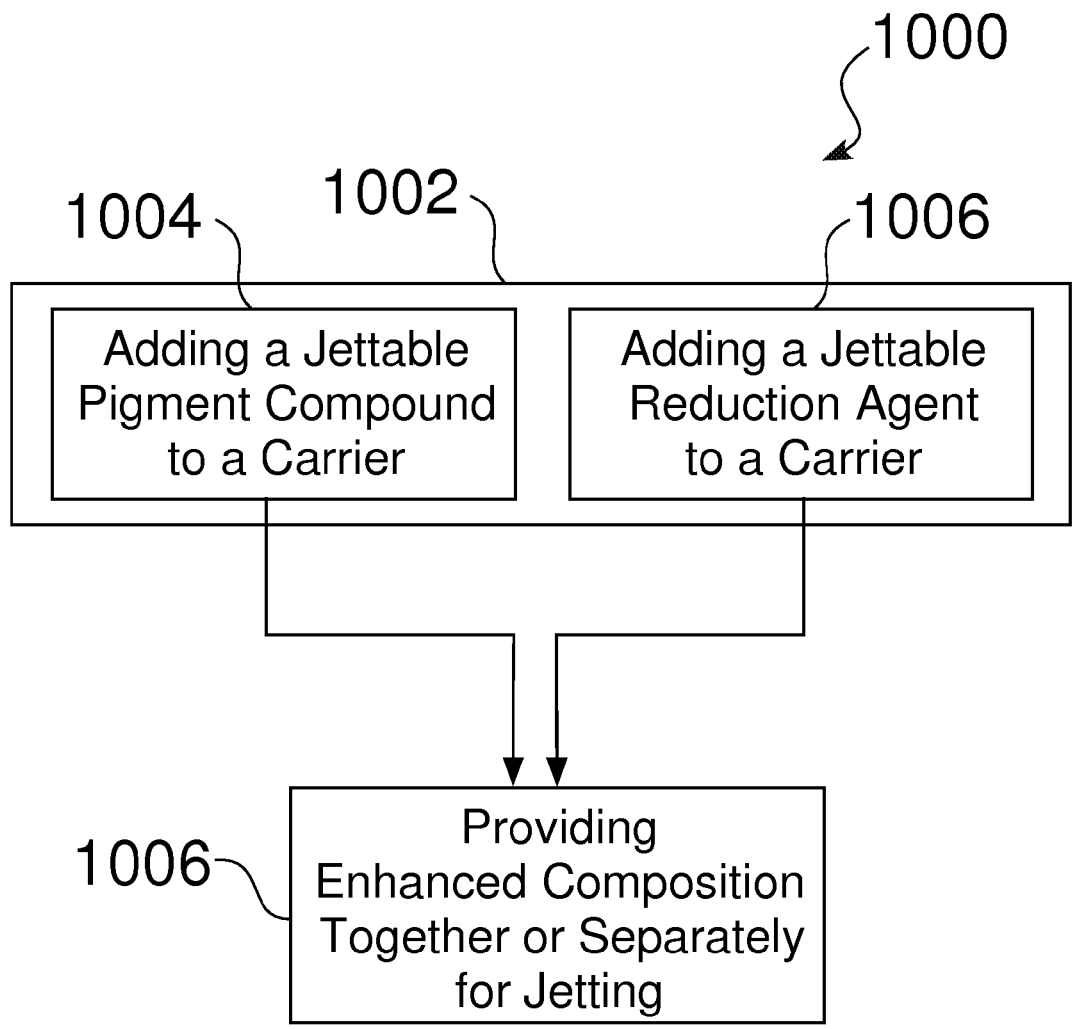
FIG. 10 is a flowchart of a method for manufacturing a jettable composition.

FIG. 10 is a flowchart of a method 1000 for manufacturing an enhanced composition 106 for jetting 502 onto a ceramic substrate 104. As shown in FIG. 10, the manufacturing 1002 can comprise adding 1004 a jettable pigment compound 108 to a carrier 902, such as water. As discussed above, the pigment compound 108 can comprise particles, e.g., copper, having an average particle size of, for example, less than 1 micron (to allow jetting), whereby the particles can be milled or polished to achieve a desired size. The manufacturing method 1000 seen in FIG. 10 also comprises adding 1006 a jettable reduction agent 110 to a carrier 902, which can be a separate carrier 902, such as for independent jetting 502 of layers 602,604 (FIG. 6, FIG. 7). In some embodiments, the jettable reduction agent 110 is added to the same carrier 902 as that used for the jettable pigment compound 108, such as for concurrent jetting 502. Once prepared, the enhanced composition 106, comprising either a single composition 106, or separate jettable components 108, 110, is typically provided for use by the printing system 302 (FIG. 3).

Figure 11:
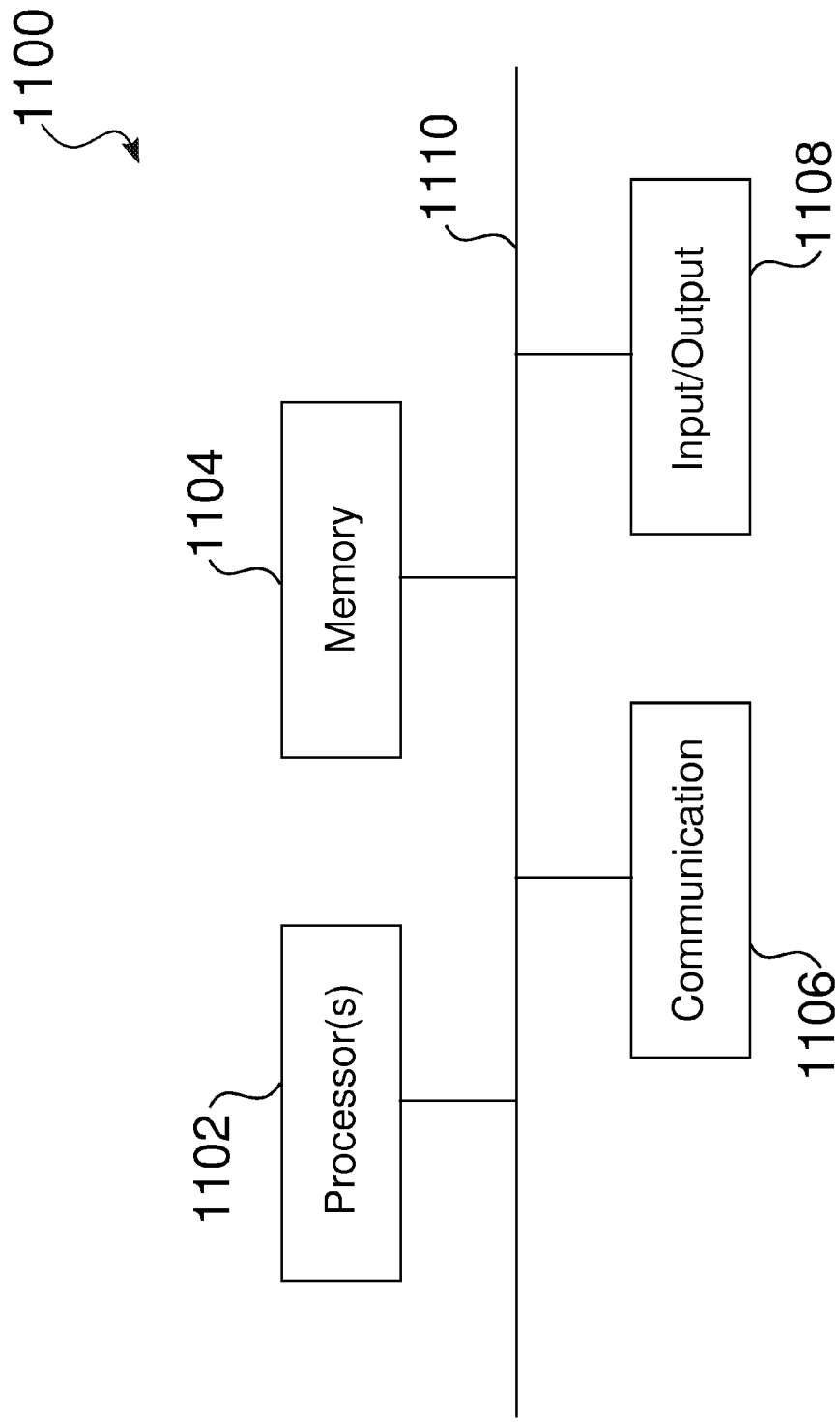
FIG. 11 is a high-level block diagram showing an example of a processing device that can represent any of the systems described herein.

FIG. 11 is a high-level block diagram showing an example of a processing device 1100 that can be a part of any of the systems described above, such as the print controller 310, the firing controller 408, or a system for manufacturing the enhanced compound 106. Any of these systems may be or include two or more processing devices such as represented in FIG. 11, which may be coupled to each other via a network or multiple networks.

In the illustrated embodiment, the processing system 1100 includes one or more processors 1102, memory 1104, a communication device 1106, and one or more input/output (I/O) devices 1108, all coupled to each other through an interconnect 1110. The interconnect 1110 may be or include one or more conductive traces, buses, point-to-point connections, controllers, adapters and/or other conventional connection devices. The processor(s) 1102 may be or include, for example, one or more general-purpose programmable microprocessors, microcontrollers, application specific integrated circuits (ASICs), programmable gate arrays, or the like, or a combination of such devices. The processor(s) 1102 control the overall operation of the processing device 1100. Memory 1104 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1104 may store data and instructions that configure the processor(s) 1102 to execute operations in accordance with the techniques described above. The communication device 1106 may be or include, for example, an Ethernet adapter, cable modem, Wi-Fi adapter, cellular transceiver, Bluetooth transceiver, or the like, or a combination thereof. Depending on the specific nature and purpose of the processing device 1100, the I/O devices 1108 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The jetting and/or firing techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, or any device with one or more processors, etc.). For example, a machine-accessible medium includes recordable/non-recordable media, e.g., read-only memory (ROM); random access memory (RAM); magnetic disk storage media; optical storage media; flash memory devices; etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A composition comprising:
a pigment compound that includes particles of a copper component, wherein the pigment compound is configured to be jetted on a substrate during an inkjet process; and
a reduction agent which, when exposed to a firing temperature having a range of 1050 degrees C. to 1300 degrees C., reacts with the pigment compound to form a glaze and cause a reduction reaction that imparts a characteristic red color component to the formed glaze.

2. The composition of claim 1, wherein the firing temperature is established within a kiln.

3. The composition of claim 1, wherein the particles of the copper component have a particle size of less than 1 micron.

4. The composition of claim 1, wherein the copper component includes any of $CuO$, $CuCO_3$, or $CuSO_4$.

5. The composition of claim 1, wherein the reduction agent comprises any of SiO, SiC, SiN, or BN.

6. The composition of claim 1, wherein the substrate comprises a ceramic substrate.

7. The composition of claim 1, wherein the characteristic red color component extends a characteristic color gamut for the composition.

8. The composition of claim 1, wherein the characteristic red color component has a characteristic wavelength of 620-740 nm upon firing.

9. The composition of claim 1, wherein the characteristic red color component takes on any of a violet, burgundy, or oxblood color having a characteristic wavelength of 380-440 nm upon firing.

10. The composition of claim 1, wherein the pigment compound is configured to be jetted onto the substrate, and wherein the reduction agent is configured to be jetted onto the pigment compound.

11. The composition of claim 1, wherein the reduction agent is configured to be jetted onto the substrate, and wherein the pigment compound is configured to be jetted onto the jetted reduction agent.

12. The composition of claim 1, wherein the pigment compound and the reduction agent are configured to be jetted concurrently onto the substrate.

13. The composition of claim 1, further comprising a carrier.

14. The composition of claim 1, further comprising any of a pigment, a dye, or a colorant.

15. The composition of claim 1, wherein the substrate comprises a porcelain substrate.

16. A method comprising:
   jetting a composition onto a substrate, wherein the composition includes
      a pigment compound that includes particles of a copper component, and
      a reduction agent; and
   causing a color effect to be produced on the substrate by heating the composition to a firing temperature having a range of 1050 degrees C. to 1300 degrees C. at which the reduction agent reacts with the pigment compound to form a glaze and cause a reduction reaction that imparts a characteristic red color component to the formed glaze.

17. The method of claim 16, wherein the substrate comprises any of a ceramic substrate or a porcelain substrate.

18. The method of claim 16, wherein the firing temperature is established within a kiln.

19. The method of claim 16, wherein the copper component includes any of CuO, $CuCO_3$, or $CuSO_4$.

20. The method of claim 16, wherein the particles of the copper component have a particle size of less than 1 micron.

21. The method of claim 16, wherein the reduction agent comprises any of SiO, SiC, SiN, or BN.

22. The method of claim 16, wherein the jetting comprises:
   jetting the pigment compound onto the substrate; and
   jetting the reduction agent onto the jetted pigment compound.

23. The method of claim 16, wherein the jetting comprises:
   jetting the reduction agent onto the substrate; and
   jetting the pigment compound onto the reduction agent.

24. The method of claim 16, wherein the jetting comprises:
   concurrently jetting the pigment compound and the reduction agent onto the substrate.

25. A printing system comprising:
   a print head assembly to jet a composition onto any of a ceramic substrate or a porcelain substrate, wherein the composition includes
      a pigment compound that includes particles of a copper component, and
      a reduction agent which, when exposed to a firing temperature having a range of 1050 degrees C. to 1300 degrees C., reacts with the pigment compound to form a glaze and cause a reduction reaction that imparts a characteristic red color component to the formed glaze.

26. The printing system of claim 25, wherein the print head assembly comprises a first print head for jetting the pigment compound, and a second print head for jetting the reduction agent.

27. The printing system of claim 25, wherein the print head assembly is configured to be concurrently jet the pigment compound and the reduction agent onto the ceramic or porcelain substrate.

28. A method for manufacturing a composition for jetting onto any of a ceramic substrate or a porcelain substrate, the method comprising:
   adding one of a jettable pigment compound and a jettable reduction agent to a liquid carrier; and
   adding the other of the jettable pigment compound or a the jettable reduction agent to the liquid carrier;
   wherein the jettable pigment compound includes particles of a copper component;
   wherein the jettable reduction agent is configured to react with the jettable pigment compound to form a glaze on the ceramic or porcelain substrate, when exposed to a firing temperature having a range of 1050 degrees C. to 1300 degrees C., to cause a reduction reaction that imparts a characteristic red color component to the formed glaze.

29. The method of claim 28, wherein the copper component comprises any of CuO, $CuCO_3$, or $CuSO_4$.

30. The method of claim 28, wherein the particles of the copper component have a size of less than 1 micron.

* * * * *